(12) United States Patent
Long et al.

(10) Patent No.: US 8,517,210 B2
(45) Date of Patent: Aug. 27, 2013

(54) SCREW PROTECTION COVER AND SHELL ASSEMBLY USING THE SAME

(75) Inventors: Shi-Jin Long, Shenzhen (CN); Li Cheng, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 891 days.

(21) Appl. No.: 12/575,877

(22) Filed: Oct. 8, 2009

(65) Prior Publication Data
US 2010/0163566 A1 Jul. 1, 2010

(30) Foreign Application Priority Data

Dec. 31, 2008 (CN) .......................... 2008 1 0306735

(51) Int. Cl.
*B65D 39/00* (2006.01)
(52) U.S. Cl.
USPC .......................... 220/789; 220/801; 411/372.6
(58) Field of Classification Search
USPC ................. 220/326, 327, 784, 785, 787–790,
220/792, 800, 801, 799; 215/320, 321, 355;
411/372.5, 372.6, 373
See application file for complete search history.

(56) References Cited

U.S. PATENT DOCUMENTS

| | | | | | |
|---|---|---|---|---|---|
| 3,208,620 | A | * | 9/1965 | Herdering | 220/4.24 |
| 3,392,873 | A | * | 7/1968 | Old, Jr. | 220/792 |
| 3,473,685 | A | * | 10/1969 | Karlan | 215/253 |
| 4,380,304 | A | * | 4/1983 | Anderson | 220/782 |
| 5,497,898 | A | * | 3/1996 | Perez | 220/800 |
| 5,838,534 | A | * | 11/1998 | Yang | 361/600 |
| 5,979,691 | A | * | 11/1999 | Von Holdt | 220/266 |
| 6,612,460 | B2 | * | 9/2003 | Ribeiro | 220/787 |
| 2005/0115732 | A1 | * | 6/2005 | Tu et al. | 174/65 R |
| 2006/0045651 | A1 | * | 3/2006 | Ma et al. | 411/372.6 |

FOREIGN PATENT DOCUMENTS

| | | | |
|---|---|---|---|
| CN | 200953570 Y | | 9/2007 |
| EP | 362549 A | * | 4/1990 |
| FR | 2858028 A1 | | 1/2005 |
| TW | 547827 | | 8/2003 |
| TW | M244710 | | 9/2004 |

* cited by examiner

*Primary Examiner* — Anthony Stashick
*Assistant Examiner* — James N Smalley
(74) *Attorney, Agent, or Firm* — Altis Law Group, Inc.

(57) ABSTRACT

An exemplary screw protection cover is provided, which includes a cover head, a cover body and a positioning piece. The cover body protrudes outward axially from one end thereof and is coaxially disposed with the cover head. The positioning piece protrudes outward from the peripheral edge of the cover head toward the cover body and is at the same side with the cover body. The positioning piece includes a stop catch disposed at the distal end thereof away from the cover head. The invention also discloses a shell assembly using the screw protection cover.

16 Claims, 4 Drawing Sheets

SCREW PROTECTION COVER AND SHELL ASSEMBLY USING THE SAME

BACKGROUND

1. Technical Field

The exemplary disclosure generally relates to a screw protection cover and a shell assembly of a portable electronic device using the same.

2. Description of Related Art

With the development of wireless technology, portable electronic devices such as mobile phones and personal digital assistants (PDAs) are now in widespread use, and consumers may now enjoy the full convenience of high technology products almost anytime and anywhere. Most of these portable electronic devices such as mobile phones typically include a front shell and a back shell fastened to the front shell by screws. Thus, the front shell or the back shell needs to define several screw holes therethrough for assembling the screws therein. However, after assembling, the screw holes of the shell are exposed which detracts from the overall appearance of the portable electronic device. In addition, contaminants, such as dust, water, etc, may attach or enter into and contaminate internal space of the portable electronic device. Accordingly, it is necessary to provide screw covers to cover/shield the corresponding screw holes.

However, the existing screw covers are easy to disengage from the corresponding screw holes and are often dropped out of the screw holes of the shell accidently as the portable electronic device is in use.

Therefore, there is room for improvement within the art.

BRIEF DESCRIPTION OF THE DRAWINGS

Many aspects of the exemplary screw protection cover and shell assembly using the same can be better understood with reference to the following drawings. These drawings are not necessarily drawn to scale, the emphasis instead being placed upon clearly illustrating the principles of the present screw protection cover and shell assembly using the same. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
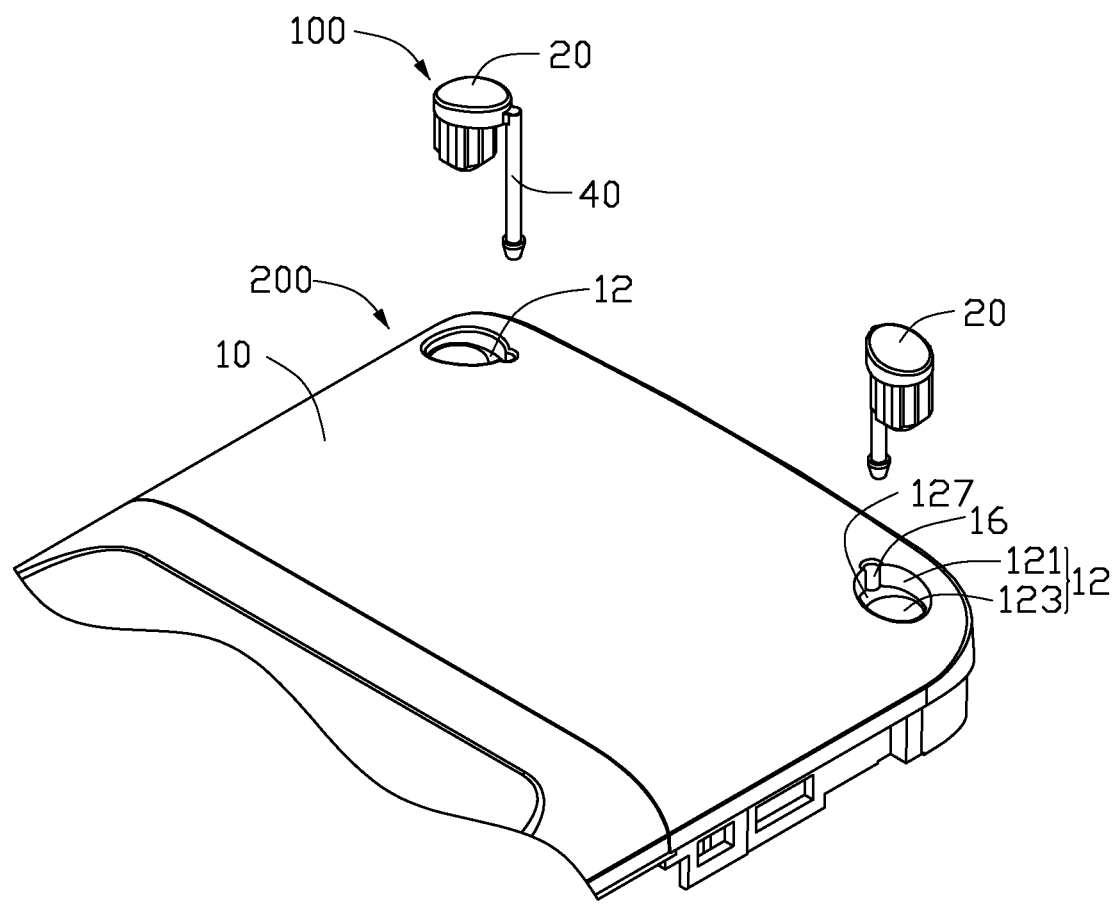
FIG. 1 shows a disassembled perspective view of a shell assembly of a portable electronic device, according to an exemplary embodiment.

FIG. 1 shows a disassembled perspective view of a shell assembly 200 of a portable electronic device (not shown), according to an exemplary embodiment. The portable electronic device can be a mobile phone, a personal digital assistant (PDA), or a digital camera, etc.

The shell assembly 200 includes a shell 10 and several screw protection covers 100 detachably assembled to the shell 10. The shell 10 can be a front shell or a back shell of the portable electronic device. The shell 10 defines several screw holes 12 and a plurality of through holes 16 therein. The screw holes 12 are configured for detachably mounting the screw protection covers 100 therein cooperatively with the through holes 16. Each screw hole 12 is a stepped-hole which includes a large hole 121, an accommodating hole 123 having a diameter smaller than that of the large hole 121 and a small hole 125 having a diameter smaller than that of the accommodating hole 123. Each accommodating hole 123 is disposed between the large hole 121 and the small hole 125, and communicates coaxially with the corresponding large hole 121 and the small hole 125. Thereby a step surface 127 is formed between each large hole 121 and its corresponding accommodating hole 123. Each small hole 125 is disposed below and communicates with a corresponding accommodating hole 123 coaxially for assembling a screw therein. Each through hole 16 is defined near a corresponding screw hole 12 and extend through the shell 10. In the exemplary embodiment, a portion of each through hole 16 respectively communicates with its corresponding large hole 121.

Figure 2:
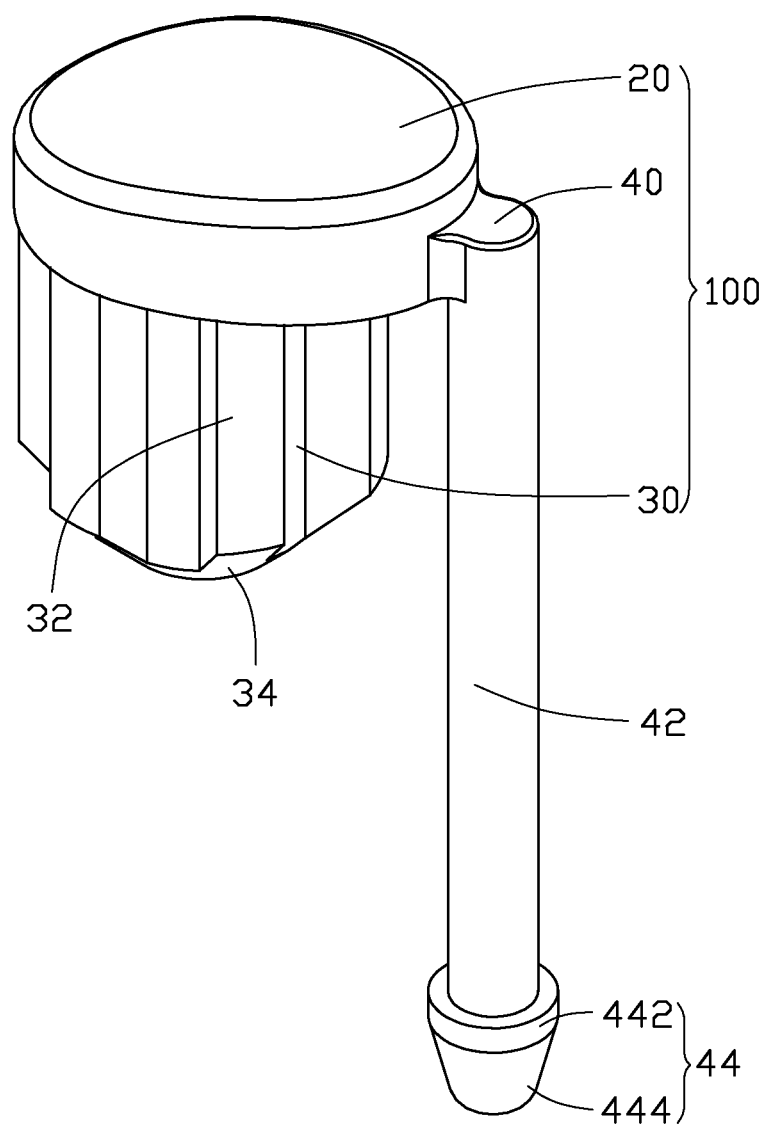
FIG. 2 shows an enlarged perspective view of a screw protection cover shown in FIG. 1.

FIG. 2 shows an enlarged perspective view of the screw protection cover 100. The screw protection cover 100 can be detachably assembled to the shell 10, and is made of flexible plastic material. The screw protection cover 100 includes a cover head 20, a cover body 30 and a positioning piece 40. The cover head 20 can be substantially cylindrical, corresponding to a cylindrical screw hole 12. The cover head 20 has a shape and size corresponding to that of the large hole 121 to be fittingly received in the large hole 121.

The cover body 30 can also be substantially cylindrical, and is coaxially positioned with the cover head 20. The cover body 30 axially protrudes from one end of the cover head 20. The cover body 30 has a shape and size corresponding to that of the accommodating hole 123 so as to be tightly/interferentially assembled within the corresponding accommodating hole 123. In the exemplary embodiment, the cover body 30 includes several spaced-apart resisting protrusions 32 disposed on the peripheral surface thereof and parallel to the cover body 30. The resisting protrusions 32 can be substantially ridge-shaped, bar-shaped or prism-shaped. Each resisting protrusion 32 defines an inclined portion 34 thereon adjacent the distal end of the cover body 30 for guiding the cover body 30 to be easily inserted into the screw hole 14.

The positioning piece 40 is substantially pin-shaped, and protrudes from the peripheral edge of the cover head 20 parallel to the cover body 30. The positioning piece 40 is disposed in the same direction with the cover body 30 relative to the cover head 20. The positioning piece 40 includes a positioning shaft 42 and a stop catch 44 disposed at a distal end of the positioning shaft 42 away from the cover head 20. The length of the positioning shaft 42 is larger than the length of the sum of cover head 20 plus the cover body 30. The diameter of the positioning shaft 42 is substantially the same as the diameter of through hole 16 and is configured to be rotatably or slidably assembled within the through hole 16. The stop catch 44 includes a substantially cylindrical connecting portion 442 and a substantially conic guiding portion 444. The connecting portion 442 extends from a distal end of the positioning shaft 42 and is coaxial with the positioning shaft 42. The guiding portion 444 is disposed at a distal end of the positioning shaft 42 and is coaxial with the connecting portion 442 and the positioning shaft 42. The diameter of the distal end of the guiding portion 444 is smaller than the diameter of the opposite connecting portion 442.

Figure 3:
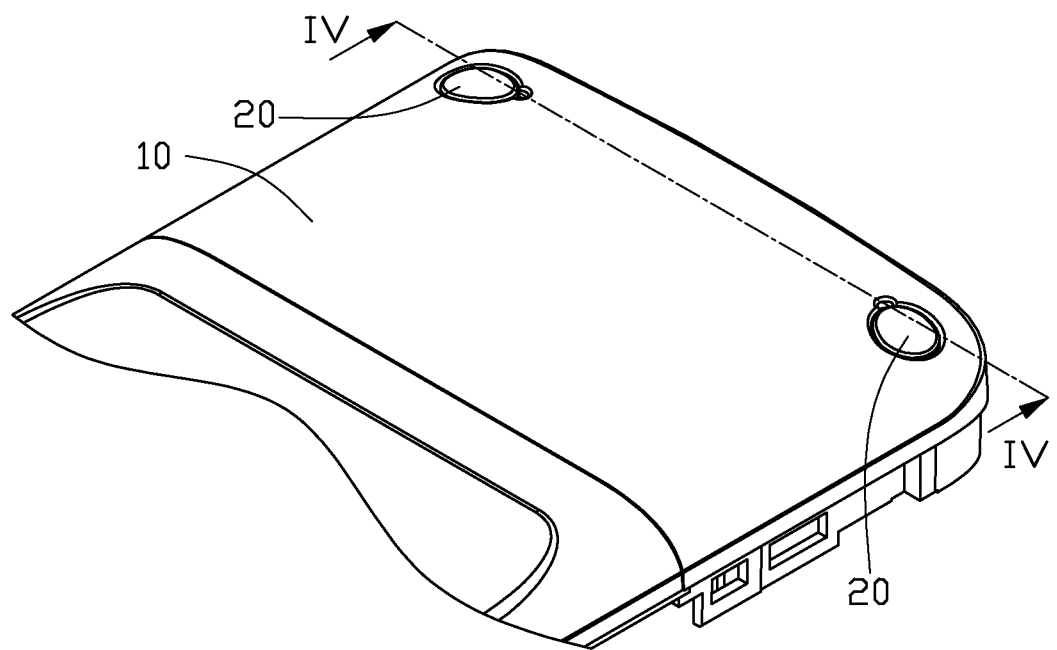
FIG. 3 shows a perspective view of the shell assembly, wherein, the screw protection cover is mounted to the shell.
Figure 4:
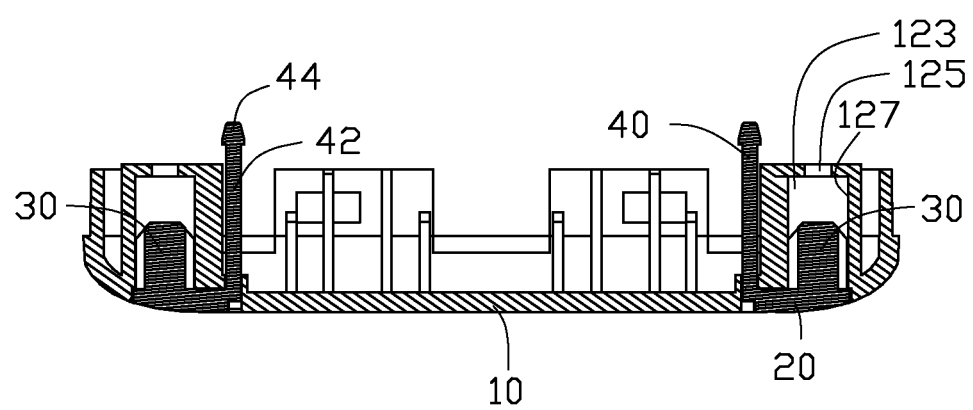
FIG. 4 shows a cross-sectional view taken along line IV-IV of FIG. 3.

FIG. 3 and FIG. 4 respectively show a perspective view of the shell assembly 200 and a cross-sectional view taken along line IV-IV of FIG. 3. In assembly, the positioning piece 40 is aligned with the through hole 16 and inserted into the through hole 16 of the shell 10. Then, the screw protection cover 100 is rotated until the cover body 30 aligns with the screw hole 12. Then, the cover head 20 of the screw protection cover 100 is pushed toward the large hole 121 of the screw hole 12, and then, the stop catch 44 of the positioning piece 40 penetrates through the through hole 16 and is latched/located at the opposite inner surface side of the shell 10. The positioning shaft 42 is assembled within the accommodating hole of the screw hole 12 simultaneously. The cover body 30 penetrates through the large hole 121 of the screw hole 12 and is tightly and partially assembled within the accommodating hole 123 of the screw hole 12. The resisting protrusions 32 of the cover body 30 tightly resist/engage with the inner surface of the accommodating hole 123. The cover head 20 is accommodated within the large hole 121 of the screw hole 12 simultaneously.

Typically, the shell assembly 200 will be provided with screw protection covers 100 prior to assembly to a main body or shell of a portable electronic device.

When the shell assembly 200 needs to be assembled to a main body or a shell of the portable electronic device, first, the stop catch 44 of the screw protection cover 100 is pushed toward the shell 10 to detach the cover head 20 and the cover body 30 from the large hole 121 and the accommodating hole 123 correspondingly. Then, the screw protection cover 100 is pulled out until the connecting portion 442 of the stop catch 44 is stopped by the step surface 127. The screw protection cover 100 is rotated relative to the shell 10 to expose the screw hole 12 for inserting a screw to assemble the shell assembly 200 with the main body or other assemblies of the portable electronic device. After the screw is inserted, the screw protection cover 100 is rotated relative to the shell 10 to a position over the screw hole 12 to be pressed into the screw hole 12.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A screw protection cover, comprising:
   a shell defining a screw hole and a through hole, the through hole defined near the screw hole;
   a cover head including a first surface, a second surface opposite to the first surface;
   a cover body protruding from the second surface of the cover head; and
   a positioning piece protruding from the second surface of the cover head and located outside of the cover body; the positioning piece comprising a cylindrical positioning shaft connecting with the cover head and a stop catch defined at a distal end of the positioning shaft spaced away from the cover head;
   wherein the cylindrical positioning shaft and the stop catch of the positioning piece extend through the through hole, the cover head and the cover body are rotated about the positioning piece until the cover head and the cover body are aligned with and received in the screw hole for positioning the cover head and the cover body in the shell.

2. The screw protection cover as claimed in claim 1, wherein the cover body includes several spaced-apart resisting protrusions disposed on the peripheral surface thereof.

3. The screw protection cover as claimed in claim 2, wherein the resisting protrusions are substantially ridge-shaped, bar-shaped or prism-shaped.

4. The screw protection cover as claimed in claim 3, wherein each resisting protrusion defines an inclined portion thereon adjacent the distal end of the cover body.

5. The screw protection cover as claimed in claim 1, wherein the positioning piece is substantially pin-shaped and parallel to the cover body.

6. The screw protection cover as claimed in claim 1, wherein the length of the positioning shaft is larger than the sum of the lengths of the cover head and the cover body; the stop catch includes a cylindrical connecting portion extending from the distal end of the positioning shaft coaxially and a guiding portion disposed at distal end of the connecting portion coaxially.

7. The screw protection cover as claimed in claim 6, wherein the shape and size of the connecting portion is larger than the length of the positioning shaft; the shape and size of the distal end of the guiding portion is smaller than the shape and size of the opposite connecting portion.

8. A shell assembly, comprising:
   a shell defining several screw holes and a plurality of through holes therein; wherein, the screw holes are configured for receiving screws therein; and
   a plurality of screw protection covers detachably assembled within the corresponding screw holes of the shell cooperatively with the through holes, for covering the corresponding screw hole, each screw protection cover comprising:
   a cover head configured to be received within the screw hole of the shell;
   a cover body protruding coaxially from one end of the cover head and configured to be assembled within the corresponding screw hole; and
   a positioning piece protruding outward from the cover head parallel to the cover body and configured to be assembled within the through hole of the shell to prevent the screw protection cover separating from the shell;
   wherein the screw hole is a stepped-hole including a large hole, an accommodating hole with a diameter smaller than the diameter of the large hole and a small hole with a diameter smaller than the diameter of the accommodating hole; the cover head and the cover body are assembled within the large hole and the accommodating hole respectively.

9. The shell assembly as claimed in claim 8, wherein the cover body includes several spaced-apart resisting protrusions disposed on the peripheral surface thereof; the length of the positioning shaft is larger than the sum of the lengths of the cover head and the cover body.

10. The shell assembly as claimed in claim 9, wherein the resisting protrusions are substantially ridge-shaped, bar-shaped or prism-shaped.

11. The shell assembly as claimed in claim 8, wherein the positioning piece includes a positioning shaft and a stop catch, the positioning shaft protrudes outward from the peripheral edge of the cover head parallel to the cover body; the stop catch is disposed at distal end of the positioning shaft and is configured to be latched to the shell.

12. The shell assembly as claimed in claim 11, wherein the diameter of the positioning shaft is substantially the same as the through hole and is configured to be rotatably or slidably assembled within the through hole.

13. The shell assembly as claimed in claim 12, wherein the stop catch includes a cylindrical connecting portion extending from the distal end of the positioning shaft coaxially and a conic guiding portion disposed at the distal end of the connecting portion coaxially.

14. A screw protection cover, comprising:
a cover head;
a cover body coaxially protruding from the cover head, the cover body including several spaced-apart resisting protrusions disposed on the peripheral surface thereof each resisting protrusion defining an inclined portion thereon adjacent the distal end of the cover body; and
a positioning piece protruding from a peripheral edge of the cover head and substantially parallel to the cover body and being disposed in the same direction as the cover body relative to the cover head; the positioning piece comprising a positioning shaft and a stop catch, the positioning shaft connecting with the cover head, the stop catch defined at a distal end thereof away from the cover head;
wherein the stop catch includes a cylindrical connecting portion extending from the distal end of the positioning shaft coaxially and a guiding portion disposed at distal end of the connecting portion coaxially.

15. The screw protection cover as claimed in claim 14, wherein the shape and size of the connecting portion is larger than the length of the positioning shaft; the shape and size of the distal end of the guiding portion is smaller than the shape and size of the opposite connecting portion.

16. The screw protection cover as claimed in claim 14, wherein a shell defines a screw hole and a through hole defined near the screw hole, the cylindrical positioning shaft and the stop catch of the positioning piece extend through the through hole, the cover head and the cover body are rotated about the positioning piece until the cover head and the cover body are aligned with the screw hole to allow the cover head and the cover body to be received in the screw hole of the shell.

* * * * *